United States Patent [19]

Spear et al.

[11] Patent Number: 5,615,903
[45] Date of Patent: Apr. 1, 1997

[54] UTILITY CART HAVING TOOL HANDLE HOLDING DEVICE

[75] Inventors: Kenneth J. Spear, Vienna; Frank G. Czerwinski, Parkersburg; Bryan S. Ritchie, Davisville, all of W. Va.

[73] Assignee: O. Ames Co., Parkersburg, W. Va.

[21] Appl. No.: 584,208

[22] Filed: Jan. 4, 1996

[51] Int. Cl.⁶ .................... B62B 5/00; B62B 1/26
[52] U.S. Cl. .............. 280/47.19; 211/70.6; 224/570; 264/238; 280/47.26
[58] Field of Search .................. 224/546, 570, 224/247, 680; 24/545; 248/222.11, 222.12; 280/47.26, 47.31, 653, 47.19, 47.24, 47.33; 211/70.6; 264/238

[56] References Cited

U.S. PATENT DOCUMENTS

| | | | |
|---|---|---|---|
| D. 298,075 | 10/1988 | Tuggle. | |
| D. 327,350 | 6/1992 | Brown et al. | D34/16 |
| D. 337,409 | 7/1993 | Maple et al. | D34/27 |
| D. 338,306 | 8/1993 | White et al. | D34/24 |
| 2,578,067 | 12/1951 | Jensen | 224/546 X |
| 2,797,851 | 7/1957 | Leake | 224/546 X |
| 4,248,365 | 2/1981 | Jacobs | 280/814 X |
| 4,620,722 | 11/1986 | Dunn | 280/814 |
| 5,013,066 | 5/1991 | Adkins | 280/814 X |
| 5,094,479 | 3/1992 | Shields | 280/814 |
| 5,106,112 | 4/1992 | Sargent | 280/814 X |

*Primary Examiner*—Brian L. Johnson
*Assistant Examiner*—Michael Mar
*Attorney, Agent, or Firm*—Cushman Darby & Cushman Intellectual Property Group of Pillsbury Madison & Sutro LLP

[57] ABSTRACT

A utility cart having a tool handle holding device for firmly holding the handle of a long handled lawn or garden tool to the side of the utility cart is disclosed. The device comprises one or more clips that are disposed below the rim of the bin of the utility cart. The cart and the clip(s) may be integrally molded from a suitable plastic material, such as high density polyethylene. Each clip is deformable within its elastic limit so that a tool handle may be insertingly forced into the clip wherein it is held within the clip, upon elastic contraction of the clip, by a tool retaining flange and a tool retaining lip. Removal of the tool handle from the clip is effected by removingly forcing the handle out of the clip whereupon the clip deforms sufficiently to allow the tool handle to pass between the tool retaining flange and the tool retaining lip. Upon removal of the handle from the clip, the clip then contracts to its pre-insertion, nondeformed condition.

9 Claims, 2 Drawing Sheets

UTILITY CART HAVING TOOL HANDLE HOLDING DEVICE

FIELD OF THE INVENTION

The present invention relates to utility carts and more specifically to improved utility carts having a device for holding the handle of a long handled yard or garden tool and securing the tool to the utility cart.

BACKGROUND OF THE INVENTION

Performing yard or garden chores typically involves any of a number of long handled yard or garden tools, such as rakes, hoes, shovels, etc. Lawn and garden work often also involves the use of some type of utility cart, such as those disclosed in U.S. Pat. Nos. DES. 327,350; DES. 337,409; and DES. 338,306, for carrying debris, tools and such. For convenience, it is desirable to be able to carry the necessary tools on the utility cart to obviate the need to carry them in hand.

Short handled lawn and garden tools, such as hand shovels and trowels, can be carried on the utility cart by inserting the handles thereof into holes provided on the body of the cart as disclosed in U.S. Pat. Nos. DES. 327,350 and DES. 337,409. Long handled tools are, however, more cumbersome and difficult to carry than are short handled tools. One option is to place the long handled tool into the bin of the utility cart. Doing so, however, impedes access to the bin and is an unstable manner in which to carry the tools. Another option, as disclosed in U.S. Pat. No. DES. 338,306, is to provide elongated cylindrical openings in the sidewalls of the cart bin into which the handle end of the tool may be inserted. The tools are then transported in the cart while extending vertically from the handle holes in the sidewalls of the bin. This arrangement is impractical for working beneath trees with low hanging limbs or shrubbery because the vertically extending tools will catch on the limbs and branches. In addition, the tools extending vertically from the sidewalls of the bin can impede access to the bin.

SUMMARY OF THE INVENTION

The object of the present invention is to provide a utility cart with the ability to firmly secure a long handled lawn or garden tool to cart in a manner which does not impede access to the bin of the utility cart and such that the secured tools will not catch on low hanging tree limbs.

This object has been accomplished by providing a utility cart having a tool handle holding device for securing the handle of a tool to the utility cart. The device includes an attachment structure constructed and arranged to facilitate attachment of the device to the utility cart and a tool handle retaining structure constructed and arranged so as to be deformable within its elastic limit so that when the tool handle is insertingly forced into the tool handle retaining structure, the tool handle retaining structure is deformed within its elastic limit from a nondeformed condition to receive the tool handle, whereupon the tool handle retaining structure contracts to a tool retaining condition so that the tool handle is retained by the tool handle retaining structure and when the tool handle is removingly forced out of the tool handle retaining structure, the tool handle retaining structure is deformed within its elastic limit from the tool retaining condition sufficiently to permit the tool handle to be released from the tool handle retaining structure, whereupon the tool handle retaining structure contracts to the nondeformed condition.

These and other objects of the present invention will become more apparent during the course of the following detailed description and appended claims. The invention may best be understood with reference to the accompanying drawings wherein an illustrative embodiment is shown.

DETAILED DESCRIPTION OF THE PRESENTLY PREFERRED EXEMPLARY EMBODIMENTS

Figure 1:
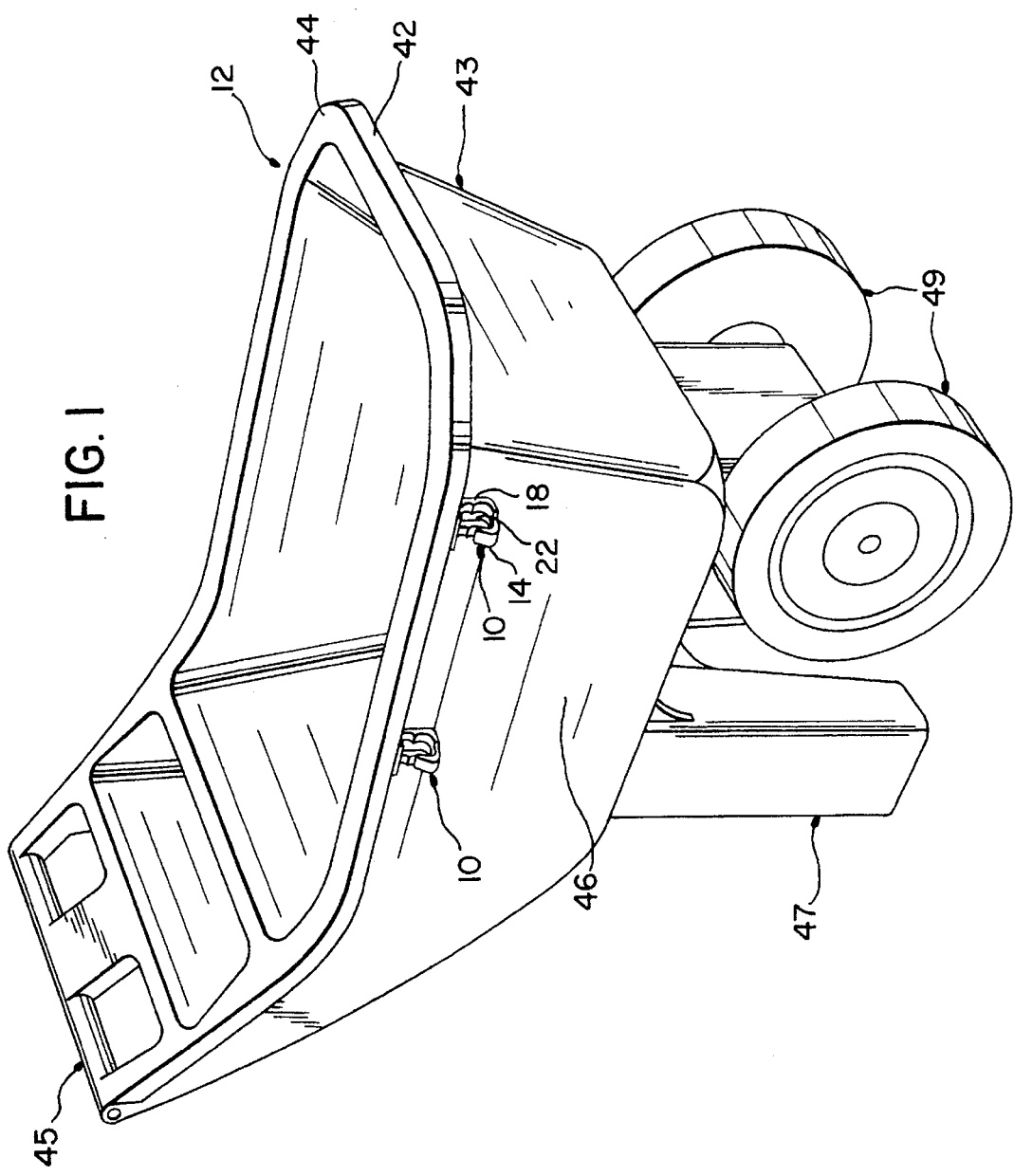
FIG. 1 is a perspective view of an improved utility cart incorporating a tool handle holding device according to the present invention.

A utility cart having a tool handle holding device according to the present invention is shown in FIG. 1. The device preferably includes a clip 10 attached beneath the peripheral rim flange 44 of the bin 43 of the utility cart 12. It is preferred that at least two clips 10 be provided beneath the rim 44.

In the presently contemplated preferred embodiment, the bin 43 of the utility cart 12 and the one or more tool handle holding clips 10 are integrally molded together from a suitable plastic composition, high density polyethylene being preferred. The utility cart 12 may also include one or more tool handle holding clips on the opposite side of the bin from that shown in FIG. 1.

In addition to the bin 43, the utility cart 12 also preferably includes wheels 49, handle grips 45, and a cart rest stand 47.

Figure 2:
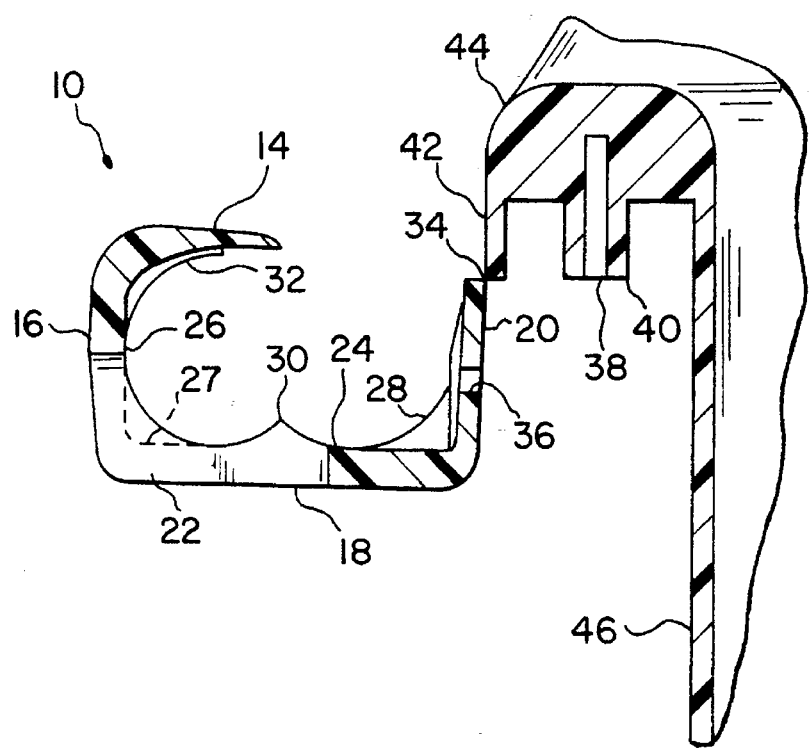
FIG. 2 is a cross-sectional view of a tool handle holding device according to the present invention in an unattached configuration.
Figure 3:
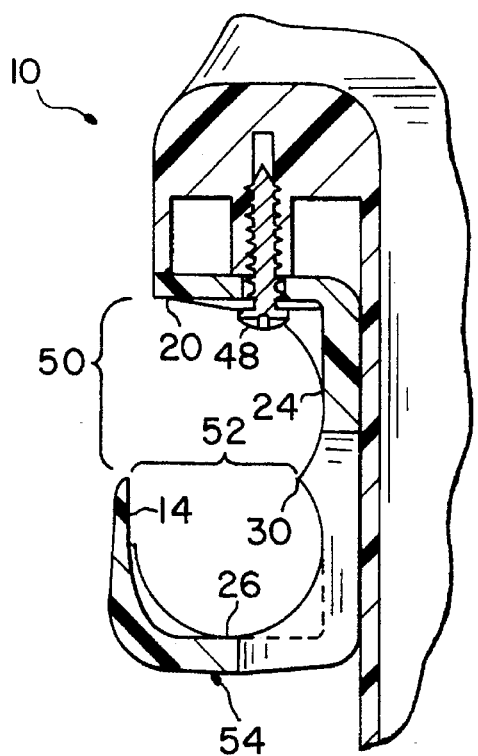
FIG. 3 is a cross-sectional view of a tool handle holding device according to the present invention in an attached configuration.

As shown in FIGS. 2 and 3, extending substantially perpendicularly away from a fastening flange 20 is a connecting portion 18 which has a flat outer portion and an inner portion that has a first rounded tool insertion surface 24, a tool retaining lip 30 and a first rounded portion of the tool receiving surface 26. One or more fastening flange gussets 28 are preferably provided between the fastening flange 20 and the connecting portion 18 to provide rigidity therebetween.

Extending substantially perpendicularly away from the connecting portion 18 is a tool supporting flange portion 16.

Finally, the clip is completed by a tool retaining flange 14 extending substantially perpendicularly from the tool supporting flange 16. The inner surfaces of the tool supporting flange 16 and the tool retaining flange 14 form the remainder of the tool receiving surface 26. The tool supporting flange 16, the tool retaining lip 30, and the tool retaining flange 14 together comprise a tool retaining structure 54.

One or more supporting flange gussets 27 are preferably provided between the tool supporting flange 16 and the connecting portion 18 to provide rigidity therebetween. Also, one or more retaining flange gussets 32 are preferably provided between the tool retaining flange 14 and the tool supporting flange 16 to provide rigidity therebetween.

An opening 22 is preferably provided which extends from an intermediate portion of the tool supporting flange 16 and extends up the connecting portion 18, preferably to a position past the tool retaining lip 30. The opening 22 serves two purposes. First, the opening allows access to the fastener 48 with a screwdriver or the like (not shown) from below the tool handle holding clip. Second, additional supporting flange gussets 27 may be provided on either side of the opening 22 to provide additional rigidity in the device.

As shown in FIG. 2, each clip is preferably molded so as to be integral with the peripheral rim flange 44 of the bin 43. The fastening flange 20 of the clip 10 is integral with a portion of the peripheral lip edge wall 42 at the point 34. The bin 43 and the one or more tool handle holding clip(s) 10 are integrally molded with the clip(s) extending outwardly from the peripheral lip edge wall 42 as shown in FIG. 2. The clip 10 is pivotable about the point 34 in the plane of FIG. 2. At the locations of tool handle clips 10, the peripheral rim flange 44 of the bin 43 has a raised boss portion 40 formed thereunder with a fastening hole 38 formed in the boss 40. To secure the clip 10 into its operable position (i.e., the position shown in FIGS. 1 and 3), the clip is rotated in a counterclockwise direction until the connecting portion 18 of the clip is in contact with the wall 46 of the bin 43 as shown in FIG. 3. A fastener 48 is inserted through the hole 36 formed in the fastening flange 20 and into the fastening hole 38 in the boss 40 to secure the clip 10 below the peripheral rim flange 44.

As shown in FIG. 3, when the clip is in its attached position, the fastening flange 20 and the tool retaining flange 14 form a tool insertion opening 50 for inserting the handle of a tool into the clip 10. Furthermore, the tool retaining lip 30 and the tool retaining flange 14 have a spacing 52 therebetween that is preferably smaller than a nominal diameter of a tool handle.

To insert a tool into the clip, the tool handle (not shown) is positioned adjacent the tool insertion opening 50 and is inserted laterally with respect to its own longitudinal axis into contact with the tool insertion surface 24 of the clip 10. The tool handle is then moved downwardly toward the space 52 between the tool retaining lip 30 and the tool retaining flange 14. As noted above, the width of the space 52 is preferably smaller than the nominal diameter of the tool handle. Therefore, the tool handle will not fall into contact with the tool receiving surface 26 without the exertion of a downward force. The tool handle is further inserted into the clip by exerting a sufficient amount of force to cause the tool retaining structure 54 to deform elastically, i.e., within its elastic limit, from a nondeformed condition such that the width of the space 52 is enlarged sufficiently that the tool handle may pass therethrough and into contact with the tool receiving surface 26. With the tool handle thus inserted, the tool handle retaining structure contracts to a tool retaining condition, which, depending upon the diameter of the tool handle, may or may not coincide with its pre-insertion nondeformed condition, so that the space 52 is again smaller than the nominal diameter of the tool handle. Therefore, the tool handle is retained within the tool retaining structure 54 of the tool clip 10 by the tool retaining lip 30 and the tool retaining flange 14.

To remove the tool handle from the clip 10, the tool handle is lifted in a direction away from the tool receiving surface 26 into the space 52 where, upon the exertion of sufficient upward force, the tool retaining structure 54 elastically deforms such that the width of the space 52 is enlarged sufficiently so that the tool handle may be removed from the tool retaining structure 54. Upon removal of the tool handle from the tool handle retaining structure 54, the tool handle retaining structure elastically contracts to its nondeformed original condition.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims.

Thus it is to be understood that variations in the particular parameters used in defining the tool handle holding device can be made without departing from the novel aspects of this invention as defined in the claims.

What is claimed is:

1. An improved utility cart comprising:

a utility cart having a tool handle holding device for securing a tool handle to said utility cart, said utility cart including a container bin having a peripheral rim flange, said tool handle holding device comprising:

an attachment structure constructed and arranged to facilitate attachment of said tool handle holding device to the utility cart, said attachment structure of said tool handle holding device being integral with said rim flange along an edge of said attachment structure; and a tool handle retaining structure constructed and arranged so as to be deformable within its elastic limit so that when the tool handle is insertingly forced into said tool handle retaining structure, said tool handle retaining structure is deformed within its elastic limit from a nondeformed condition to receive the tool handle, whereupon said tool handle retaining structure contracts to a tool retaining condition so that the tool handle is retained by said tool handle retaining structure and when the tool handle is removingly forced out of said tool handle retaining structure, said tool handle retaining structure is deformed within its elastic limit from the tool retaining condition sufficiently to permit the tool handle to be released from the tool handle retaining structure, whereupon the tool handle retaining structure contracts to the nondeformed condition, said container bin and said tool handle holding device being integrally molded with said tool handle holding device extending outwardly away from said peripheral rim flange, said tool handle holding device being pivotable about the edge of said attachment structure at which the attachment structure is integral with said peripheral rim flange into an operable position below said peripheral rim flange, said tool handle holding device being secured into the operable position.

2. The utility cart of claim 1, said tool handle retaining structure further comprising:

a tool handle retaining lip;

a tool handle supporting flange; and a tool handle retaining flange, said tool handle retaining lip and said tool handle retaining flange having a spacing therebetween that is smaller than a nominal width of the tool handle, said tool handle retaining structure deforming within its elastic limit when the tool handle is insertingly forced into the spacing between said tool handle retaining flange and said tool handle retaining lip so that the spacing between said tool handle retaining flange and said tool handle retaining lip is enlarged sufficiently to permit the tool handle to pass therethrough and into supporting contact with said tool handle supporting flange whereupon said tool handle retaining structure contracts to the tool retaining condition wherein the size of said spacing is smaller than the nominal width of the tool handle so that the tool handle is retained in supporting contact with the tool handle supporting flange by the tool handle retaining flange and the tool handle retaining lip, said tool handle retaining structure deforming within its elastic limit when the tool handle is removingly forced into said spacing between said tool handle retaining flange and said tool handle retaining lip so that said spacing is enlarged sufficiently to permit the tool handle to pass therethrough to remove the tool handle from said device.

3. The utility cart of claim 1 wherein said utility cart and said tool handle holding device are molded from high density polyethylene.

4. The utility cart of claim 1 wherein said tool handle holding device is secured in the operable position below said rim flange by a fastener extending through said attachment structure into said peripheral rim flange.

5. The utility cart of claim 1 comprising more than one tool handle holding device.

6. A cart having a tool handle holding device for supporting a portion of a tool handle on said cart, said tool handle holding device comprising:

handle retaining structure constructed and arranged to receive the portion of the tool handle and releasably retain the portion of the tool handle on said cart, said handle retaining structure being integrally molded in a molded position with said cart, said handle retaining structure having a receiving portion with a lateral opening and an elastically deformable retaining portion for retaining the portion of the tool handle, said handle retaining structure being constructed and arranged to be pivotable with respect to said cart between said molded position and an operative position in which said handle retaining structure is capable of receiving and releasably retaining the portion of the tool handle; and fastening structure constructed and arranged to secure said handle retaining structure with respect to said cart in said operative position.

7. The cart of claim 5 wherein said cart and said handle retaining structure are molded from high density polyethylene.

8. The cart of claim 6 wherein said fastening structure comprises a mechanical fastener connecting a portion of said handle retaining structure with a portion of said cart.

9. The cart of claim 6 further comprising a second tool handle holding device for supporting a spaced portion of the tool handle on said cart, said second tool handle holding device comprising:

second handle retaining structure constructed and arranged to receive the spaced portion of the tool handle and releasably retain the spaced portion of the tool handle on said cart, said second handle retaining structure being integrally molded in a molded position with said cart, said second handle retaining structure being constructed and arranged to be moveable with respect to said cart between said molded position and an operative position in which said second handle retaining structure is capable of receiving and releasably retaining the spaced portion of the tool handle; and second fastening structure constructed and arranged to secure said second handle retaining structure with respect to said cart in said operative position.

\* \* \* \* \*